(12) United States Patent
Hess et al.

(10) Patent No.: US 9,208,552 B2
(45) Date of Patent: Dec. 8, 2015

(54) METHOD AND SYSTEM FOR HYBRID RETICLE INSPECTION

(75) Inventors: Carl Hess, Los Altos, CA (US); John D. Miller, San Jose, CA (US); Shan Xue, Santa Clara, CA (US); Patrick LoPresti, San Jose, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 149 days.

(21) Appl. No.: 13/814,535

(22) PCT Filed: Apr. 23, 2012

(86) PCT No.: PCT/US2012/034665
§ 371 (c)(1),
(2), (4) Date: Feb. 6, 2013

(87) PCT Pub. No.: WO2012/148848
PCT Pub. Date: Nov. 1, 2012

(65) Prior Publication Data
US 2013/0279792 A1     Oct. 24, 2013

Related U.S. Application Data

(60) Provisional application No. 61/611,236, filed on Mar. 15, 2012, provisional application No. 61/478,998, filed on Apr. 26, 2011.

(51) Int. Cl.
*G06K 9/00*     (2006.01)
*G06T 7/00*     (2006.01)

(52) U.S. Cl.
CPC .............. *G06T 7/0004* (2013.01); *G06T 7/001* (2013.01); *G06T 2207/20012* (2013.01); *G06T 2207/30148* (2013.01)

(58) Field of Classification Search
CPC .................. G06T 7/0004; G06T 2207/30148; H01J 2237/2817; H01J 2237/2441; G03F 1/84; G03F 7/7065; G03F 1/72; G01N 21/956; G01N 2021/95676; G01R 31/311
USPC .................. 382/141, 144, 145, 149; 348/125
See application file for complete search history.

(56) References Cited

U.S. PATENT DOCUMENTS

| | | | |
|---|---|---|---|
| 5,563,702 A * | 10/1996 | Emery et al. | 356/73 |
| 5,717,204 A * | 2/1998 | Meisburger et al. | 250/310 |
| 6,252,412 B1 * | 6/2001 | Talbot et al. | 324/754.22 |
| 6,614,520 B1 | 9/2003 | Bareket et al. | |
| 6,654,489 B2 | 11/2003 | Wiley et al. | |
| 6,865,726 B1 * | 3/2005 | Igusa et al. | 716/105 |
| 7,630,535 B2 * | 12/2009 | Isomura | 382/144 |
| 7,741,601 B2 * | 6/2010 | Noji et al. | 250/310 |
| 8,417,713 B1 * | 4/2013 | Blair-Goldensohn et al. | 707/751 |
| 8,515,828 B1 * | 8/2013 | Wolf et al. | 705/26.7 |
| 8,699,824 B2 * | 4/2014 | Cheng et al. | 382/305 |
| 8,781,102 B2 * | 7/2014 | Conway et al. | 379/265.06 |

(Continued)

*Primary Examiner* — Barry Drennan
*Assistant Examiner* — Aklilu Woldemariam
(74) *Attorney, Agent, or Firm* — Suiter Swantz pc llo (57) ABSTRACT

A semiconductor inspection apparatus performs a hybrid inspection process including cell-to-cell inspection, die-to-die inspection and die-to-golden or die-to-database inspection. The apparatus creates a golden image of a reticle complimentary to portions of the reticle that can be inspected by cell-to-cell inspection or die-to-die inspection. Alternatively, the apparatus creates a reduced database complimentary to portions of the reticle that can be inspected by cell-to-cell inspection or die-to-die inspection.

27 Claims, 6 Drawing Sheets

(56) References Cited

U.S. PATENT DOCUMENTS

| | | | |
|---|---|---|---|
| 2004/0016897 A1* | 1/2004 | Stokowski et al. | 250/559.45 |
| 2004/0170313 A1* | 9/2004 | Nakano et al. | 382/145 |
| 2004/0209171 A1* | 10/2004 | Ibusuki | 430/5 |
| 2005/0018899 A1* | 1/2005 | Elyasaf et al. | 382/145 |
| 2005/0174570 A1* | 8/2005 | Kvamme et al. | 356/237.5 |
| 2006/0019173 A1* | 1/2006 | Yamamoto | 430/5 |
| 2006/0234139 A1* | 10/2006 | Watson et al. | 430/5 |
| 2007/0071307 A1* | 3/2007 | Isomura | 382/149 |
| 2007/0117029 A1* | 5/2007 | Ibusuki | 430/5 |
| 2007/0288219 A1* | 12/2007 | Zafar et al. | 703/14 |
| 2008/0013824 A1* | 1/2008 | Yamaguchi et al. | 382/149 |
| 2008/0130982 A1* | 6/2008 | Kitamura et al. | 382/144 |
| 2008/0249764 A1* | 10/2008 | Huang et al. | 704/9 |
| 2008/0270116 A1* | 10/2008 | Godbole et al. | 704/9 |
| 2009/0037134 A1* | 2/2009 | Kulkarni et al. | 702/127 |
| 2009/0080759 A1* | 3/2009 | Bhaskar et al. | 382/141 |
| 2009/0216524 A1* | 8/2009 | Skubacz et al. | 704/9 |
| 2010/0119053 A1* | 5/2010 | Goeldi | 379/265.09 |
| 2010/0121707 A1* | 5/2010 | Goeldi | 705/14.49 |
| 2010/0121849 A1* | 5/2010 | Goeldi | 707/736 |
| 2010/0145719 A1* | 6/2010 | Williams et al. | 705/2 |
| 2010/0149505 A1* | 6/2010 | Sewell et al. | 355/67 |
| 2010/0226562 A1* | 9/2010 | Wu et al. | 382/149 |
| 2010/0306123 A1* | 12/2010 | Cai et al. | 705/347 |
| 2011/0137906 A1* | 6/2011 | Cai et al. | 707/740 |
| 2011/0163230 A1* | 7/2011 | Hiroi et al. | 250/310 |
| 2011/0170091 A1* | 7/2011 | Chang et al. | 356/237.5 |
| 2011/0225174 A1* | 9/2011 | Artzt et al. | 707/750 |
| 2011/0249811 A1* | 10/2011 | Conway et al. | 379/88.01 |
| 2011/0276513 A1* | 11/2011 | Erhart et al. | 705/347 |
| 2011/0286656 A1* | 11/2011 | Kulkarni et al. | 382/144 |
| 2011/0307312 A1* | 12/2011 | Goeldi | 705/14.6 |
| 2012/0047174 A1* | 2/2012 | Avner et al. | 707/777 |
| 2012/0051621 A1* | 3/2012 | Ong et al. | 382/144 |
| 2012/0086799 A1* | 4/2012 | Hess | 348/125 |

\* cited by examiner

METHOD AND SYSTEM FOR HYBRID RETICLE INSPECTION

PRIORITY

The present application is related to and claims the benefit of the earliest effective filing date from International Application No. PCT/US12/34665, filed Apr. 23, 2012, which claims priority to U.S. Provisional Application Ser. No. 61/478,998, filed Apr. 26, 2011, and U.S. Provisional Application Ser. No. 61/611,236, filed Mar. 15, 2012, which are all incorporated herein by reference.

FIELD OF THE INVENTION

The present invention is directed generally toward inspection in semiconductor processing, and more particularly a hybrid inspection process.

BACKGROUND OF THE INVENTION

Inspection and metrology technologies are conventionally used in semiconductor wafer facilities for material monitoring, disposition, yield prediction, and yield management. Reticles are inspected at various times to identify changes in a reticle over time. Reticle defects that are changing in time relate to the wafer fabrication requalification where the reticle is inspected to ensure it has not become contaminated during storage or usage. One particularly memory intensive inspection process, called die-to-golden inspection, involves imaging the relevant portions of a known, clean substrate. The clean image is known as a "golden image" of the reticle. The golden image is generally taken immediately after the reticle has been cleaned and verified with a die-to-database inspection. The die-to-database inspection is an optical comparison of the reticle (or portions of the reticle) to a computer rendered image of the design database used to create the reticle.

Once the golden image is stored, subsequent images of the substrate are compared to the golden image. Any variations are identified as changes or contamination to the reticle.

Golden images are on the order of 8 terabytes per reticle. A semiconductor production process may include 1000 reticles. Total storage for golden images for a single semiconductor wafer could exceed 8000 terabytes. 8000 terabytes of golden image data is expensive to store and expensive to utilize. In addition to the cost of maintaining sufficient storage media, golden images may not be stored where the inspection process takes place, so golden images are also expensive in terms of data bandwidth to transmit the golden images to the inspection site. Furthermore, golden images may include images taken of both reflected light and transmitted light; effectively doubling the amount of data.

Data compression can reduce the total amount of storage necessary, but the advantages are limited. A reduction by a factor 5-10 is desirable but cannot be attained through compression alone.

Alternatively, a reticle may be inspected with reference to the semiconductor design database used to produce the reticle. The semiconductor design database is a perfectly accurate reference that may be used to render an image of the resulting reticle. While a semiconductor design database may not consume as much storage space as a series of golden images, the storage requirement is still substantial. A semiconductor design database may be 1 terabyte or more for a single reticle; therefore a semiconductor wafer requiring 1000 reticles still requires 1000 terabytes of storage and corresponding bandwidth to transfer the databases from their storage location to the inspection site. Furthermore, rendering a semiconductor design database is extremely computationally intensive, often requiring a supercomputer.

Another type of inspection process, cell-to-cell inspection, is a mode wherein locally repeating structures are compared to each other, and any noted difference is declared to be a defect. Cell-to-cell inspection has been long used in both wafer and reticle inspection. This modality has advantages in that the reference data is very closely spaced to the test region so that the inspection tool does not need to be particularly stable to successfully employ this approach, and no stored reference image is necessary. Similar to cell-to-cell inspection, die-to-die inspection is a mode of inspection wherein identical dies on the same substrate are compared.

Consequently, it would be advantageous if an apparatus existed that is suitable for performing hybrid inspections to reduce the amount of data necessary during a die-to-golden inspection and die-to-database inspection.

SUMMARY OF THE INVENTION

Accordingly, the present invention is directed to a novel method and apparatus for performing hybrid inspections to reduce the amount of data necessary during a die-to-golden inspection and die-to-database inspection.

One embodiment of the present invention is a method for determining which portions of a reticle require a golden image. The method may include identifying appropriate cell-to-cell inspection candidates and die-to-die inspection candidates. The method may include acquiring and storing a golden image for only those portions of a reticle that are not suitable for cell-to-cell and die-die inspection.

Another embodiment of the present invention is a method for reducing the amount of data required for a die-to-golden inspection by identifying cell-to-cell inspection candidates and die-to-die inspection candidates in a reticle, and only storing golden images for other portions of the reticle. The method may include applying a data compression algorithm.

Another embodiment of the present invention is a die-to-golden inspection apparatus that determines portions of the reticle suitable for cell-to-cell or die-to-die inspection, and performs a die-to-golden inspection on the remaining portions. The apparatus may also utilize "aerial imaging" techniques. Aerial imaging techniques may be performed at multiple focal values.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
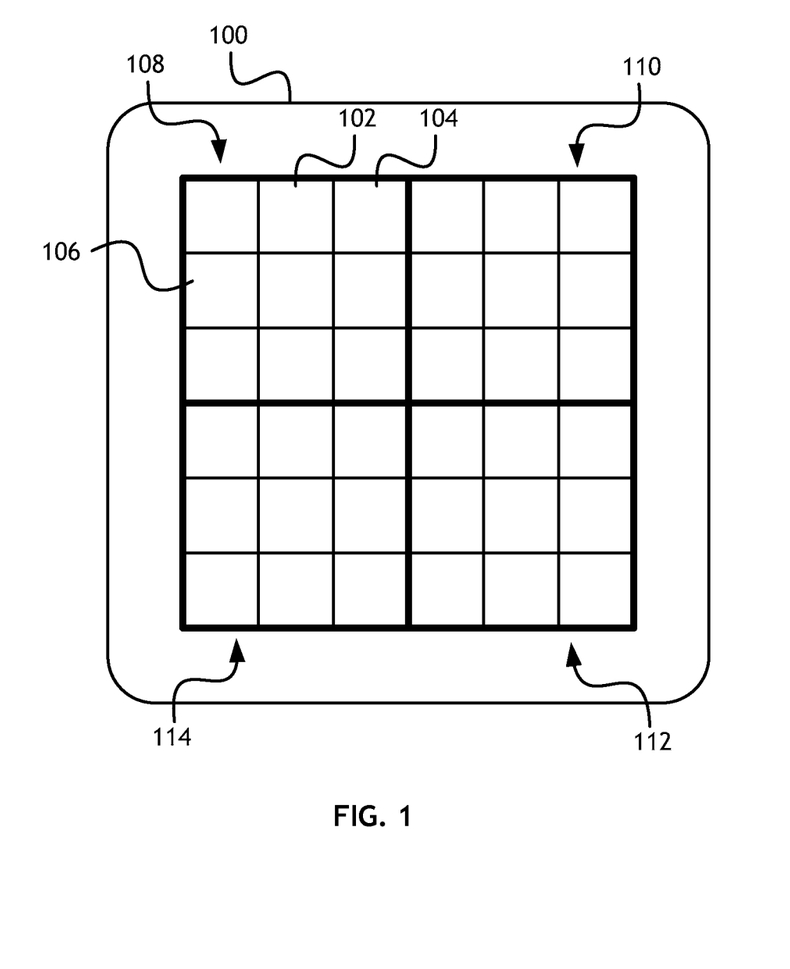
FIG. 1 shows a block diagram of a reticle.

Referring to FIG. 1, a block diagram representation of a reticle 100 is shown. During lithographic fabrication, one or more reticles 100 are used to construct electronic components onto a semiconductor wafer through methods known in the art. The features on the reticle 100 that define those electronic components may be organized into groups called cells 102, 104, 106. Some cells 102, 104, 106 may comprise identical components in identical orientations such that a properly aligned comparison of two such cells, for example a first cell 102 and a second cell 104, would reveal a defect or contamination in either the first cell 102 or the second cell 104 of the reticle 100. Furthermore, a reticle 100 may also contain cells 102, 104, 106 that are very similar but not identical. A semiconductor fabrication process may require certain cells, for example a third cell 106, to be slightly different as compared to other cells, for example the first cell 102 and the second cell 104, even though all three cells 102, 104, 106 may contain substantially the same components in substantially the same orientation. Processes such as optical proximity correction may alter the design of certain cells to correct for potential irregularities in the fabrication process. A comparison of the first cell 102 and the third cell 106 may indicate a defect even if both cells 102, 106 were fabricated properly according to the intended design (false defects).

A reticle 100 may also be organized into dies 108, 110, 114, 112; each die 108, 110, 114, 112 substantially similar to one or more other dies 108, 110, 114, 112 on the reticle 100. Where two or more dies 108, 110, 114, 112 are identical, die-to-die inspection can be performed to identify changes in the reticle used to produce the dies.

Figure 2:
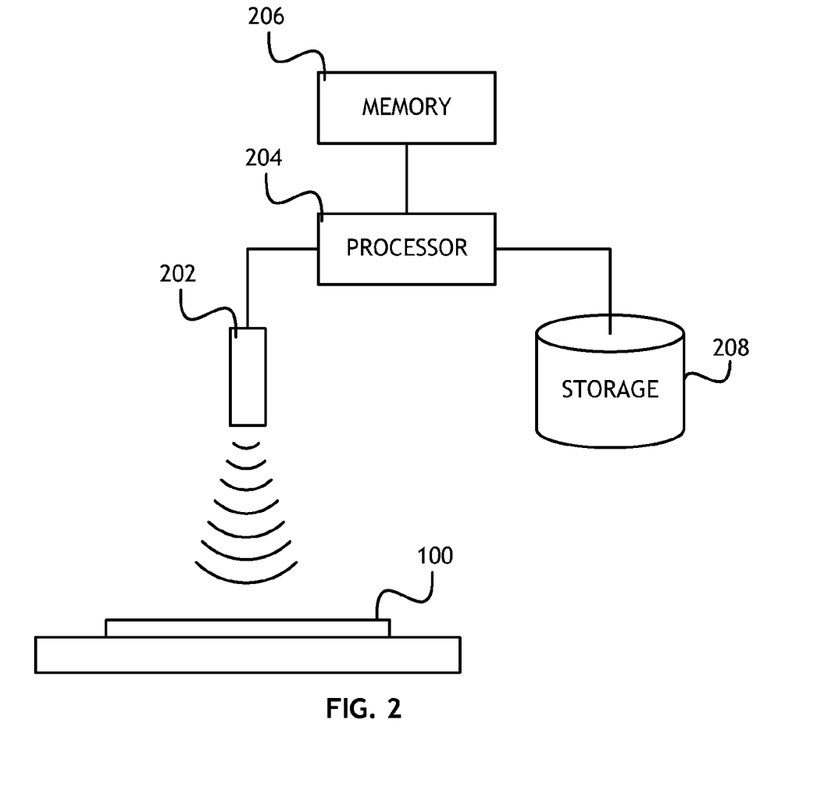
FIG. 2 shows a block diagram of a system suitable for performing a hybrid inspection of a reticle.

Referring to FIG. 2, an apparatus for producing a reduced semiconductor design database, or database image, of a reticle 100 for a hybrid inspection, and for performing a hybrid inspection of a reticle 100 is shown. The apparatus may include a processor 204, memory 206 connected to the processor 204 and a data storage 208 connected to the processor 204. The processor 204 may analyze the semiconductor design database to identify cells intended by design to have identical structure, which are therefore appropriate for cell-to-cell inspection. Additionally, the processor 204 may identify repeated dies in a reticle 100. Repeated dies may be appropriate for die-to-die inspection. The processor 204 may then perform a die-to-database inspection of regions of the reticle 100 where cell-to-cell inspection and die-to-die inspection are not available. The processor 204 may produce a map of regions requiring die-to-database inspection, or the processor 204 may produce a rendered image those regions from the semiconductor design database. The processor 204 may then store the resulting image or map to the data storage 208. In another embodiment, the processor 204 may produce and store a variant of the semiconductor design database (reduced database) containing only those portions where cell-to-cell inspection and die-to-die inspection are not available. During a subsequent inspection process, a processor 204 may only need to retrieve and transfer the reduced map or image, or the reduced database stored in the data storage 208. The processor 204 may perform a cell-to-cell inspection on those regions of the reticle where cell-to-cell inspection is appropriate. The processor may also perform a die-to-die inspection on those regions of the reticle where die-to-die inspection is appropriate.

Where the processor 204 is connected to the semiconductor design database, and further connected to an imaging device 202, the processor 204 may read the semiconductor design database and render those regions identified in the map as requiring die-to-database inspection. This apparatus may reduce the storage and bandwidth burdens of a die-to-database inspection.

Semiconductor wafer fabrication facilities often have numerous inspection tools to support the amount of inspection capacity desired during production. A single semiconductor design database repository connected to those numerous inspection tools reduces the logistical burden of duplicating the semiconductor design database and reduces the fleet level cost. Utilizing the present invention, each inspection only requires a small fraction of the full semiconductor design database. Therefore, a system designed to support the transfer of a full semiconductor design database at speed should be able to handle the transfer of multiple reduced databases. Such a system may require the addition of a computer "fetcher" server for each inspection tool.

Alternatively, the apparatus of FIG. 2 may produce one or more reduced golden images for use in a hybrid inspection process. The apparatus may include a processor 204, memory 206 connected to the processor 204, an imaging device 202 connected to the processor 204 and a data storage 208 connected to the processor 204. The processor 204 may capture a golden image of a reticle 100 and analyze the image to identify cells intended by design to have identical structure, which are therefore appropriate for cell-to-cell inspection. Such analysis may include autocorrelation analysis or any other procedure appropriate for identifying cell-to-cell inspection candidates. Additionally, the processor 204 may identify repeated dies in a reticle 100. Repeated dies may be appropriate for die-to-die inspection. The processor 204 may then perform a die-to-golden inspection of regions of the reticle 100 where cell-to-cell inspection and die-to-die inspection are not available. The processor 204 may store, on the data storage 208, portions of the golden image (reduced golden image) concerning regions of the reticle 100 where cell-to-cell inspection or die-to-die inspection are not available. During a subsequent inspection process, a processor 204 may only need to retrieve and transfer the reduced golden image from the data storage 208. A die-to-golden inspection is only necessary for regions of the reticle 100 where other inspection processes are not available. This apparatus may reduce the storage and bandwidth burdens of a die-to-golden inspection. The processor 204 may perform a cell-to-cell inspection on those regions of the reticle 100 where cell-to-cell inspection is appropriate. The processor may also perform a die-to-die inspection on those regions of the reticle 100 where die-to-die inspection is appropriate.

During subsequent hybrid die-to-database or hybrid die-to golden inspections, defects or contamination in the reticle 100 may be identified as variants during a cell-to-cell inspection, a die-to-die inspection or a die-to-database/die-togolden inspection. The locations of any defects or contamination may be recorded to track changes in the reticle 100 over time.

One potential issue in utilizing cell-to-cell inspection is the possibility of intentional, miniscule variances in the structure of cells that are otherwise identical. For example, model-based Optical-Proximity-Correction (OPC) for reticles and Flare Correction for extreme ultraviolet (EUV) reticles can lead to very subtle differences in the design of nearly repeating patterns. These changes may include, for example, a very small jog in a long straight line with no apparent purpose. Existing methods of determining whether a region is sufficiently repeating for the application of cell-to-cell inspection uses the images themselves. This means that a subtle design difference between cells can easily be declared a defect rather than an intentional design feature (false defect).

The potential for false defects may be reduced or eliminated by identifying cell-to-cell inspection candidates through an analysis of the semiconductor design database for the cells. The processor 204 may perform an analysis such as an autocorrelation analysis on a rendered image of the design database to identify cell-to-cell inspection candidates. Peaks in the autocorrelation may indicate repeating patterns of various fidelity and size. With a rendered semiconductor design database, there is no measurement noise at all. Alternatively, the semiconductor design database may include a hierarchy that identifies the locations of identical features. The processor 204 may then produce a region map indicating cells identified as appropriate for cell-to-cell inspection. The processor 204 may also identify reference points from the semiconductor design database 208 and include those reference points in the region map so that the region map may be properly aligned with an actual fabricated reticle 100. The region map may be stored in memory 206 or in the data storage 208. During subsequent inspection processes, the region map may identify regions appropriate for cell-to-cell inspection.

Storage space for golden images may be further reduced with data compression. Basic lossless data compression may reduce storage needs by approximately 20-30%, although those skilled in the art may appreciate that actual compression depends on many factors. Data compression may result in some loss in data fidelity (quantization noise), but may have secondary benefits. For example, if a processor 204 removes the 2 least significant bits in an 8-bit data stream, there is an immediate reduction of 25% of the storage needs. However, the data may also be made more coarsely quantized. Coarse quantization may make data compression over noisy uniform fields more effective. Data fidelity loss is given by quantization noise from data loss. Quantization noise is uniform, uncorrelated noise which adds quadrature to other noise sources. Coarse quantization may be a useful step in data compression if the needed inspection sensitivity can still be achieved.

Data storage needs may be further reduced by storing only reflected light images instead of both reflected and transmitted light. Excluding transmitted light images reduces data storage needs by half. Similarly, images having larger pixel size may be employed to decrease the amount of storage needed by the square of the pixel ratio. Specifically for reticles, an aerial image similar to that produced in a stepper may use a relatively large (125 nm) pixel. A large pixel may indicate whether a change will have a printing impact on the wafer. To perform an aerial image inspection, the imaging device 202 should match the illumination and imaging pupil profiles of the stepper. Larger pixel size may make "early detection" more difficult, but may also reduce sensitivity to focus changes. Storage savings may be five-fold. Furthermore, aerial imaging may be performed at multiple focus values leading to a full process-window inspection that can find defects that have a printing impact anywhere in the focus process window of the stepper. Certain defects that primarily have a phase rather than transmissivity impact may have a larger off-focus printing impact as compared to best focus.

The apparatus of FIG. 2 may also perform a hybrid die-to-golden inspection. Where a region map based on a semiconductor design database is stored in a data storage 208, the processor 204 may read the region map. The region map may indicate regions of the reticle 100 suitable for cell-to-cell inspection. The processor 204 may then image the reticle 100 using the imaging device 202. The processor 204 may then orient the region map and the image of the reticle 100 based on corresponding reference points. The processor 204 may then perform cell-to-cell inspection on regions of the reticle 100 identified by the region map as appropriate for cell-to-cell inspection. Where the processor 204 identifies defects or contamination based on the cell-to-cell inspection, the processor 204 may record the location of the defect or contamination in the data storage 208. The processor 204 may also perform a die-to-die inspection on the image of the reticle 100 in regions where die-to-die inspection is appropriate. Where the processor 204 identifies defects or contamination based on the die-to-die inspection, the processor 204 may record the location of the defect or contamination in the data storage 208.

In regions of the reticle 100 where cell-to-cell inspection and die-to-die inspection are inappropriate, the processor 204 may retrieve a reduced golden image from the data storage 208. The reduced golden image may include only those portions of the reticle 100 that are not suitable for cell-to-cell inspection or die-to-die inspection. The processor 204 may then perform a die-to-golden inspection utilizing the reduced golden image. Where the processor 204 identifies defects or contamination based on die-to-golden inspection, the processor 204 may record the location of the defect or contamination in the data storage 208.

One skilled in the art may appreciate that while the forgoing discussion focused on reticle 100 inspection, all of the same principles, processes and structures may be applicable to semiconductor wafer inspection. One skilled in the art may further appreciate that the same principles and procedures may be applied to any number of images necessary to inspect all of the reticles 100 for a given semiconductor.

Figure 3:
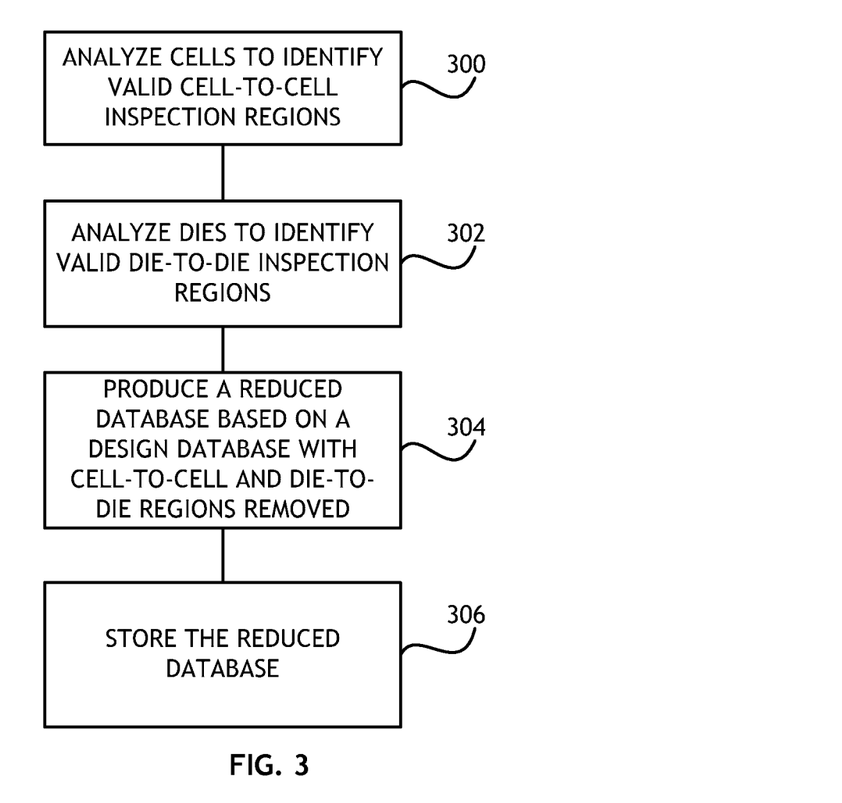
FIG. 3 shows a flowchart for a method for producing a reduced database for a hybrid die-to-database inspection.

Referring to FIG. 3, a flowchart for preparing a reduced database for use in a hybrid inspection process of a reticle is shown. A processor may analyze 300 cells to identify valid cell-to-cell inspection regions. Analyzing cells may include autocorrelation analysis of an image of a reticle, or other processes known in the art. Analyzing cells may also include reading a semiconductor design database and rendering the semiconductor design database in high fidelity. In this embodiment high fidelity refers the noise level of the resulting image as compared to images generally produced by inspection hardware at the time of inspection.

Where a processor renders the semiconductor design database, the processor may then perform an autocorrelation analysis to determine regions of the semiconductor design database that are truly repeating and discard cell-to-cell matching regions based on a threshold of the autocorrelation analysis. In some embodiments, such as when the processor is not currently conducting an inspection, the processor may output a region map of valid cell-to-cell inspection regions. Alternatively, where the processor is currently performing an inspection, the processor may directly utilize the identified regions to perform cell-to-cell inspection without producing a region map, or producing the region map as a transitory data structure.

Alternatively, in a semiconductor design database there may be a "hierarchy" which indicates patterns that are exactly repeating in the semiconductor design database. The pattern may only be described in detail one time, and then there may be an indication of all the places where the pattern is located. Hierarchy is used as a means of compressing the semiconductor design database. A processor can analyze a semiconductor design database for the hierarchy that is employed to determine those regions that are truly repeating and therefore appropriate for cell-to-cell inspection.

A processor may also analyze 302 dies to identify valid die-to-die inspection regions. The processor may then produce 304 a reduced database based on the semiconductor design database with regions appropriate for either cell-to-cell inspection or die-to-die inspection removed. The processor may then store 306 the reduced database in a data storage.

Figure 4:
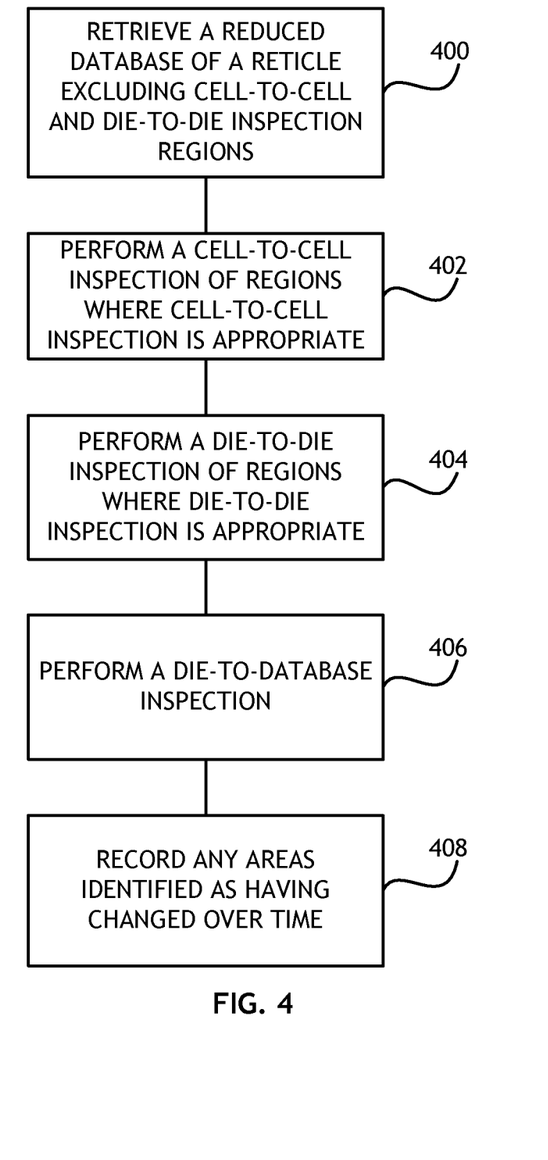
FIG. 4 shows a flowchart for a method for performing a hybrid die-to-database inspection of a reticle with a reduce database.

Referring to FIG. 4, a flowchart for utilizing a reduced database in a hybrid inspection process is shown. A processor in the inspection apparatus may read 400 a reduced database identifying regions in a reticle appropriate for cell-to-cell inspection and die-to-die inspection. The processor may then perform 402 a cell-to-cell inspection of regions where the reduced database indicates cell-to-cell inspection is appropriate. The processor may then perform 404 a die-to-die inspection of regions where the reduced database indicates die-to-die inspection is appropriate. The processor may then perform 406 a die-to-database inspection utilizing the reduced database. The processor may record 408 any areas identified as having changed over time based on either the cell-to-cell inspection, the die-to-die inspection or the die-to-database inspection.

Figure 5:
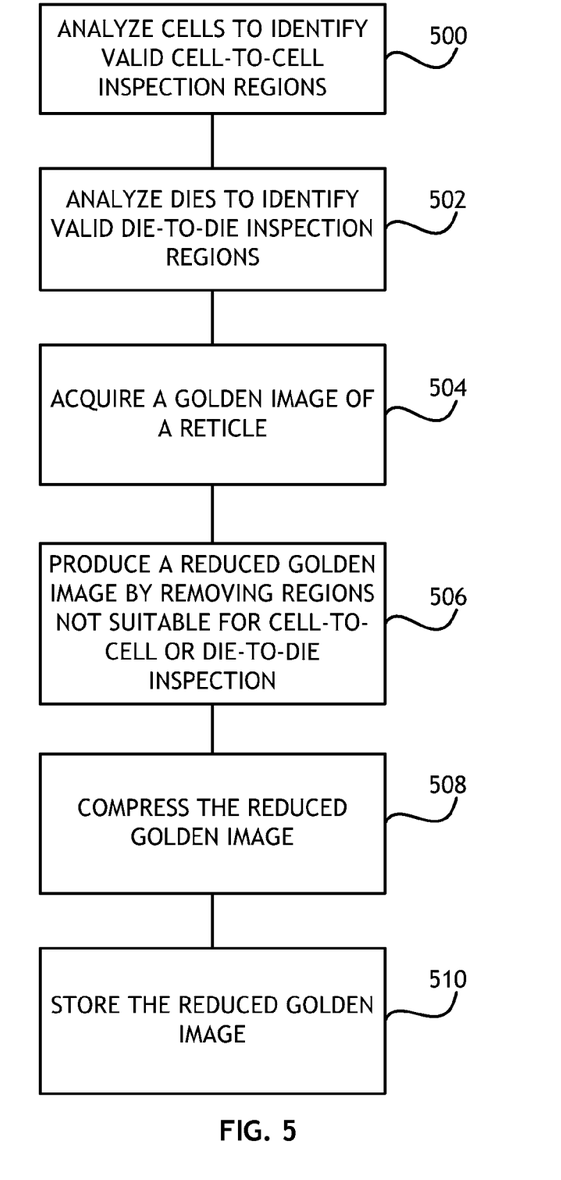
FIG. 5 shows a flowchart for a method for producing a reduced golden image for a hybrid die-to-golden inspection.

Referring to FIG. 5, a flowchart for preparing a reduced golden image for use in a hybrid inspection process of a reticle is shown. A processor may analyze 500 cells to identify valid cell-to-cell inspection regions. Analyzing cells may include autocorrelation analysis of an image of a reticle, or other processes known in the art. Analyzing cells may also include reading a semiconductor design database and rendering the semiconductor design database in high fidelity. In this embodiment high fidelity refers the noise level of the resulting image as compared to images generally produced by inspection hardware at the time of inspection.

Alternatively, in a semiconductor design database there may be a "hierarchy" which indicates patterns that are exactly repeating in the semiconductor design database. The pattern may only be described in detail one time, and then there may be an indication of all the places where the pattern is located. Hierarchy is used as a means of compressing the semiconductor design database. A processor can analyze a semiconductor design database for the hierarchy that is employed to determine those regions that are truly repeating and therefore appropriate for cell-to-cell inspection.

A processor may also analyze 502 dies to identify valid die-to-die inspection regions. The processor may then acquire a golden image 504 of a reticle and produce 506 a reduced golden image based on the golden image with regions appropriate for either cell-to-cell inspection or die-to-die inspection removed. One skilled in the art may appreciate that where analyzing cell-to-cell inspection and die-to-die inspection candidates based on a reticle image, the golden image may be used; in that case acquiring the golden image may precede the analysis. The golden image and reduced golden image may comprise a reflected light image or a transmitted light image.

The processor may then compress 508 the reduced golden image. The processor may then store 510 the reduced golden image in a data storage.

Figure 6:
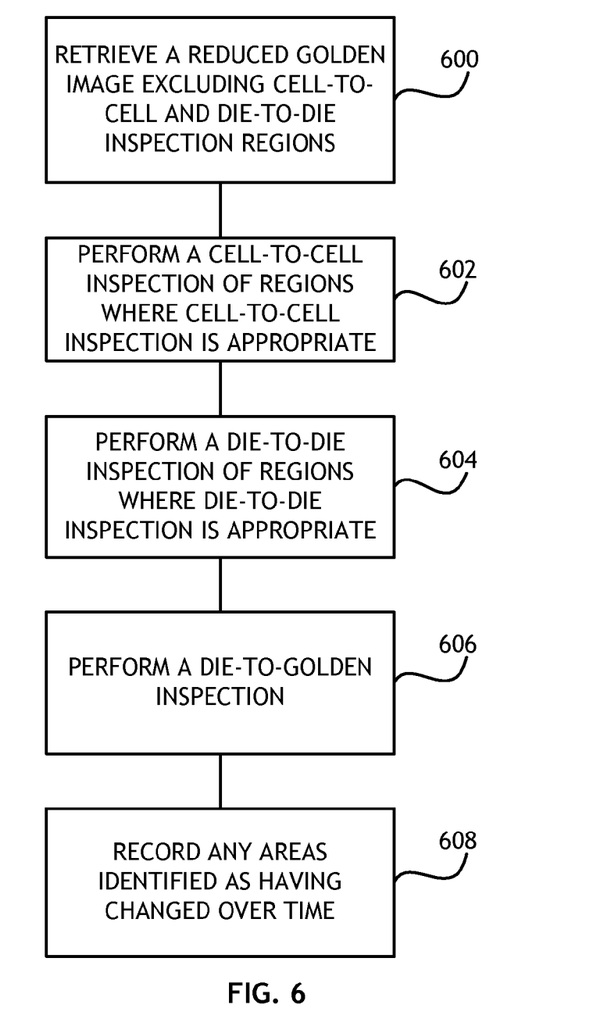
FIG. 6 shows a flowchart for a method for performing a hybrid die-to-golden inspection of a reticle with a reduced golden image.

Referring to FIG. 6, a flowchart for utilizing a reduced golden image in a hybrid inspection process is shown. A processor in the inspection apparatus may retrieve 600 a reduced golden image of regions in a reticle inappropriate for cell-to-cell inspection and die-to-die inspection, and indicating where such inspection is appropriate. The processor may then perform 602 a cell-to-cell inspection of regions where the reduced golden image indicates cell-to-cell inspection is appropriate. The processor may then perform 604 a die-to-die inspection of regions where the reduced golden image indicates die-to-die inspection is appropriate. The processor may then perform 606 a die-to-golden inspection utilizing the reduced golden image. The processor may record 608 any areas identified as having changed over time based on either the cell-to-cell inspection, the die-to-die inspection or the die-to-golden inspection.

The methods and devices described herein provide advantages in data storage as compared to the prior art. A smaller quantity of stored data may also reduce the bandwidth usage associated with pushing the data to an imaging computer connected to an inspection station. Reduced bandwidth usage may help the inspection proceed more quickly and reduce the cost to construct such an inspection station.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A inspection apparatus comprising:
a processor;
memory connected to the processor;
computer executable program code configured to execute on the processor,
wherein the computer executable program code is configured to:
produce a reduced database containing portions of a semiconductor design database unsuitable for at least one of a cell-to-cell inspection or a die-to-die inspection and excluding portions of the semiconductor design database suitable for at least one of a cell-to-cell inspection or a die-to-die inspection, portions of the semiconductor design database unsuitable for at least one of a cell-to-cell inspection or a die-to-die inspection comprising portions sufficiently similar to appear identical during a real-time inspection process but having features that would result in a false defect identification during such real-time inspection; and
store the reduced database for reference during a wafer inspection process.

2. The apparatus of claim 1, wherein the computer executable program code is further configured to analyze the semiconductor design database to identify one or more regions appropriate for cell-to-cell inspection.

3. The apparatus of claim 2, wherein analyzing the semiconductor design database comprises performing an autocorrelation analysis.

4. The apparatus of claim 2, wherein analyzing the semiconductor design database comprises performing a hierarchy analysis.

5. The apparatus of claim 1, further comprising an imaging device connected to the processor, configured for imaging a reticle, wherein the computer executable program code is further configured to acquire an image of a reticle.

6. The apparatus of claim 5, wherein the computer executable program code is further configured to identify one or more regions appropriate for cell-to-cell inspection based on an autocorrelation analysis of the image of a reticle.

7. A inspection apparatus comprising:
a processor;
memory connected to the processor;
an imaging device connected to the processor, configured to image a reticle; and
computer executable program code configured to execute on the processor,
wherein the computer executable program code is configured to:
produce a reduced golden image comprising portions of a reticle unsuitable for at least one of a cell-to-cell inspection or a die-to-die inspection and excluding portions of the reticle suitable for at least one of a cell-to-cell inspection or a die-to-die inspection, portions of the reticle unsuitable for at least one of a cell-to-cell inspection or a die-to-die inspection comprising portions sufficiently similar to appear identical during a real-time inspection process but having features that would result in a false defect identification during such real-time inspection; and
store the reduced golden image for reference during a wafer inspection process.

8. The apparatus of claim 7, wherein the computer executable program code is further configured to acquire a golden image of the reticle.

9. The apparatus of claim 8, wherein the computer executable program code is further configured to analyze the golden image to identify one or more regions appropriate for one of cell-to-cell inspection or die-to-die inspection.

10. The apparatus of claim 9, wherein analyzing the golden image comprises performing an autocorrelation analysis.

11. The apparatus of claim 9, wherein producing the reduced golden image comprises removing regions of the golden image identified as appropriate for one of cell-to-cell inspection or die-to-die inspection.

12. A inspection apparatus comprising:
a processor;
memory connected to the processor;
an imaging device connected to the processor, configured to image a reticle; and
computer executable program code configured to execute on the processor,
wherein the computer executable program code is configured to retrieve a reference, such reference configured to:
identify at least one region of a reticle with reference to a reduced design database comprising portions of the reticle suitable for at least one of a cell-to-cell inspection or a die-to-die inspection and excluding portions of the reticle suitable for at least one of a cell-to-cell inspection or a die-to-die inspection, portions of the reticle unsuitable for at least one of a cell-to-cell inspection or a die-to-die inspection comprising portions sufficiently similar to appear identical during a real-time inspection process but having features that would result in a false defect identification during such real-time inspection, such region being suitable for at least one of cell-to-cell inspection or die-to-die inspection derived from a design database; and
provide suitable data to perform an inspection of one or more additional regions of a reticle, such one or more additional regions being unsuitable for at least one of cell-to-cell inspection or die-to-die inspection.

13. The apparatus of claim 12, wherein the computer executable program code is further configured to perform a cell-to-cell inspection of at least one region suitable for cell-to-cell inspection identified in the reference.

14. The apparatus of claim 13, wherein the computer executable program code is further configured to record a location of a defect or a contamination identified by the cell-to-cell inspection.

15. The apparatus of claim 12, wherein the computer executable program code is further configured to perform a die-to-die inspection of at least one region suitable for die-to-die inspection identified in the reference.

16. The apparatus of claim 15, wherein the computer executable program code is further configured to record a location of a defect or a contamination identified by the die-to-die inspection.

17. The apparatus of claim 12, wherein the reference is a reduced database.

18. The apparatus of claim 12, wherein the reference is a reduced golden image.

19. A method for producing a reference for
a hybrid inspection, such method comprising:
identifying, with a computer processor, at least one region of a reticle appropriate for at least one of cell-to-cell inspection or die-to-die inspection by referencing a reduced design database comprising portions of the reticle suitable for at least one of a cell-to-cell inspection or a die-to-die inspection and excluding portions of the reticle suitable for at least one of a cell-to-cell inspection or a die-to-die inspection, portions of the reticle unsuitable for at least one of a cell-to-cell inspection or a die-to-die inspection comprising portions sufficiently similar to appear identical during a real-time inspection process but having features that would result in a false defect identification during such real-time inspection;
identifying, with a computer processor, one or more additional regions of the a reticle inappropriate for at least one of cell-to-cell inspection or die-to-die inspection; and
producing a reference, with a computer processor,
wherein the reference:
identifies the at least one region of the reticle appropriate for at least one of cell-to-cell inspection or die-to-die inspection; and
contains data sufficient to perform an inspection of the one or more additional regions of the reticle inappropriate for at least one of cell-to-cell inspection or die-to-die inspection.

20. The method of claim 19, wherein identifying the at least one region appropriate for at least one of cell-to-cell inspection or die-to-die inspection comprises performing one of an autocorrelation analysis or a hierarchy analysis on a semiconductor design database.

21. The method of claim 19, further comprising compressing the reference with a computer processor.

22. The method of claim 19, wherein identifying the at least one region appropriate for at least one of cell-to-cell inspection or die-to-die inspection comprises performing an autocorrelation analysis on a golden image.

23. A method for producing a reference for
a hybrid inspection, such method comprising:

retrieving a reference with a computer processor from a data storage element the reference comprising portions of the reticle suitable for at least one of a cell-to-cell inspection or a die-to-die inspection and excluding portions of the reticle suitable for at least one of a cell-to-cell inspection or a die-to-die inspection, portions of the reticle unsuitable for at least one of a cell-to-cell inspection or a die-to-die inspection comprising portions sufficiently similar to appear identical during a real-time inspection process but having features that would result in a false defect identification during such real-time inspection;

identifying, with a computer processor, at least one region of a reticle appropriate for at least one of cell-to-cell inspection or die-to-die inspection based on the reference;

performing, with a computer processor, at least one of a cell-to-cell inspection or a die-to-die inspection of the identified region; and performing, with a computer processor, a defect/contamination inspection of one or more additional regions of the a reticle identified as inappropriate for at least one of cell-to-cell inspection or die-to-die inspection by comparing an image of the a reticle to data contained in the reference, wherein the reference:
  identifies the at least one region of a reticle appropriate for at least one of cell-to-cell inspection or die-to-die inspection; and
  contains data sufficient to perform an inspection of the one or more additional regions of the a reticle inappropriate for at least one of cell-to-cell inspection or die-to-die inspection.

24. The method of claim 23, wherein the reference is a reduced database.

25. The method of claim 23, wherein the reference is a reduced golden image.

26. The apparatus of claim 1, wherein the computer executable code is further configured to:
  produce a rendered image derived from portions of the semiconductor design database unsuitable for either a cell-to-cell inspection or a die-to-die inspection;
  store the rendered image correlated to the reduced database for reference during a wafer inspection process.

27. The method of claim 19, wherein the reference comprises a rendered image derived from portions of a semiconductor design database unsuitable for either a cell-to-cell inspection or a die-to-die inspection.

* * * * *